United States Patent
Amento et al.

(10) Patent No.: US 8,769,589 B2
(45) Date of Patent: Jul. 1, 2014

(54) SYSTEM AND METHOD TO CREATE A MEDIA CONTENT SUMMARY BASED ON VIEWER ANNOTATIONS

(75) Inventors: Brian Amento, Morris Plains, NJ (US); Mukesh Nathan, Florham Park, NJ (US); Larry Stead, Montclair, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1047 days.

(21) Appl. No.: 12/414,786

(22) Filed: Mar. 31, 2009

(65) Prior Publication Data

US 2010/0251295 A1    Sep. 30, 2010

(51) Int. Cl.
*H04N 7/173* (2011.01)
*G06F 7/00* (2006.01)
*G06F 17/30* (2006.01)

(52) U.S. Cl.
USPC .............................. 725/86; 700/748; 700/749

(58) Field of Classification Search
None
See application file for complete search history.

(56) References Cited

U.S. PATENT DOCUMENTS

| | | | |
|---|---|---|---|
| 6,173,317 B1 * | 1/2001 | Chaddha et al. ............. 709/219 |
| 6,298,482 B1 | 10/2001 | Seidman et al. |
| 6,353,824 B1 | 3/2002 | Boguraev et al. |
| 6,370,543 B2 * | 4/2002 | Hoffert et al. ................ 725/113 |
| 6,496,981 B1 | 12/2002 | Wistendahl et al. |
| 6,560,281 B1 * | 5/2003 | Black et al. ................... 375/240 |
| 7,111,009 B1 * | 9/2006 | Gupta et al. ............. 369/30.08 |
| 7,191,462 B1 * | 3/2007 | Roman et al. .................... 725/98 |
| 7,631,327 B2 | 12/2009 | Dempski et al. |
| 7,647,555 B1 * | 1/2010 | Wilcox et al. ................. 715/721 |
| 7,720,851 B2 * | 5/2010 | Chang et al. ................... 707/749 |
| 7,774,817 B2 * | 8/2010 | Gupta ............................. 725/86 |
| 7,859,539 B2 * | 12/2010 | Beckman ....................... 345/473 |
| 7,860,854 B2 * | 12/2010 | Lipson et al. ................. 707/707 |
| 7,895,625 B1 * | 2/2011 | Bryan et al. ..................... 725/46 |
| 8,005,841 B1 * | 8/2011 | Walsh et al. ................... 707/739 |
| 8,065,302 B2 * | 11/2011 | Sridhar et al. ................ 707/736 |
| 8,065,710 B2 * | 11/2011 | Malik ........................... 725/109 |
| 8,099,315 B2 | 1/2012 | Amento et al. |
| 8,117,210 B2 * | 2/2012 | Cerosaletti et al. ........... 707/749 |
| 2002/0069218 A1 * | 6/2002 | Sull et al. .................... 707/501.1 |
| 2002/0188949 A1 * | 12/2002 | Wang et al. ...................... 725/46 |
| 2002/0199194 A1 * | 12/2002 | Ali ................................... 725/46 |
| 2003/0066068 A1 * | 4/2003 | Gutta et al. ........................ 725/9 |
| 2003/0101104 A1 * | 5/2003 | Dimitrova et al. .............. 705/27 |
| 2003/0182620 A1 * | 9/2003 | Errico et al. ................ 715/500.1 |
| 2003/0221198 A1 * | 11/2003 | Sloo ............................... 725/136 |
| 2004/0068758 A1 * | 4/2004 | Daily et al. ................... 725/136 |
| 2004/0237032 A1 * | 11/2004 | Miele et al. ................... 715/512 |
| 2004/0268398 A1 * | 12/2004 | Fano et al. ...................... 725/88 |
| 2005/0004930 A1 * | 1/2005 | Hatta ............................. 707/102 |

(Continued)

*Primary Examiner* — Brian Pendleton
*Assistant Examiner* — Jonathan V Lewis
(74) *Attorney, Agent, or Firm* — Toler Law Group, PC

(57) ABSTRACT

A computer implemented method includes receiving, at a media server, a request from a first viewer to create a media content server including select segments of media content for display at a display device. The computer implemented method includes accessing a media content analyzer generated based on viewer annotation data associated with media content. The viewer annotation data is received from viewers other than the first viewer. The computer implemented method includes identifying segments of the media content using the media content analyzer. The computer implemented method includes selecting at least one segment of the identified segments of the media content for inclusion in a media content summary. The computer implemented method includes sending the media content summary including the at least one selected segment of the media content to the display device.

21 Claims, 8 Drawing Sheets

(56) References Cited

U.S. PATENT DOCUMENTS

| | | |
|---|---|---|
| 2005/0071865 A1* | 3/2005 | Martins .......................... 725/10 |
| 2005/0114908 A1* | 5/2005 | Li et al. ........................ 725/135 |
| 2005/0160457 A1* | 7/2005 | Rui et al. ....................... 725/45 |
| 2006/0101499 A1* | 5/2006 | Aravamudan et al. .......... 725/86 |
| 2006/0170760 A1 | 8/2006 | Anderson, Jr. |
| 2007/0006262 A1 | 1/2007 | Cleron et al. |
| 2007/0250901 A1* | 10/2007 | McIntire et al. .............. 725/146 |
| 2008/0059872 A1 | 3/2008 | Tseng |
| 2008/0126191 A1* | 5/2008 | Schiavi .......................... 705/14 |
| 2010/0005485 A1* | 1/2010 | Tian et al. ...................... 725/32 |
| 2010/0008643 A1* | 1/2010 | Rakib et al. .................... 386/68 |
| 2010/0070527 A1* | 3/2010 | Chen ............................ 707/772 |
| 2010/0070987 A1 | 3/2010 | Amento et al. |
| 2010/0169906 A1* | 7/2010 | Takahashi ....................... 725/13 |
| 2010/0198835 A1* | 8/2010 | Sorvari et al. ................. 707/748 |

* cited by examiner

SYSTEM AND METHOD TO CREATE A MEDIA CONTENT SUMMARY BASED ON VIEWER ANNOTATIONS

FIELD OF THE DISCLOSURE

The present disclosure is generally related to creating a media content summary based on viewer annotations.

BACKGROUND

Summaries of media content can enable users to make decisions about whether to examine a particular media content in greater detail. Browsing summaries of media content can also support incidental learning, enabling users to view the most interesting portions of the media content without viewing the media content in its entirety. A media summary may be created by an expert who selects portions of the media content based on his or her expert opinion. For example, a movie trailer expert may select segments of a movie to create a movie trailer. A video-on-demand service may enable users to view movie trailers associated with movies available on-demand to enable the users to determine whether or not to purchase a movie for viewing.

DETAILED DESCRIPTION

Figure 1:
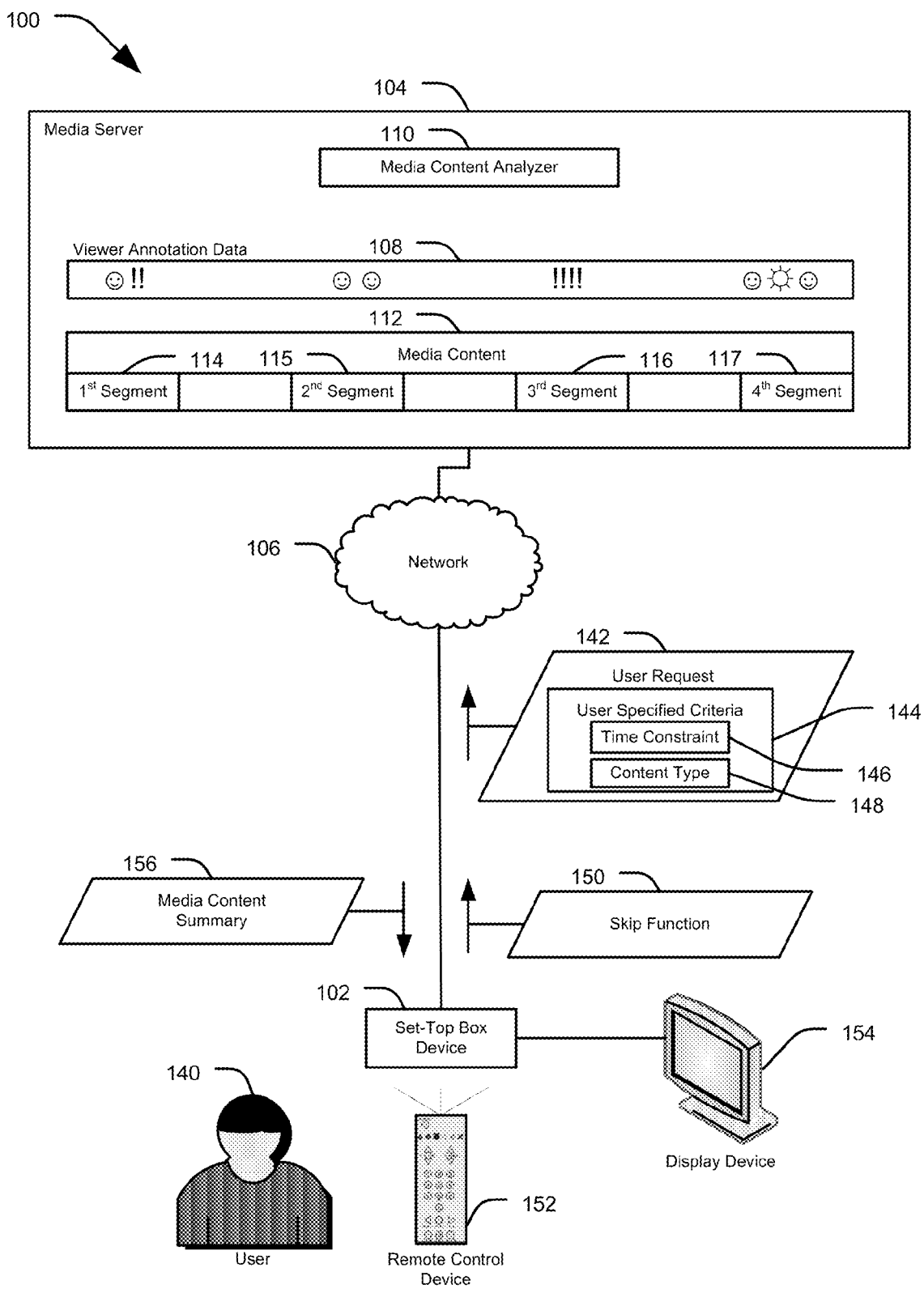
FIG. 1 is a block diagram of a first particular embodiment of a system to create a media content summary based on viewer annotations.

In a particular embodiment, a computer implemented method includes receiving, at a media server, a request from a first user to create a media content summary including select segments of media content. The computer implemented method includes accessing a media content analyzer generated based on viewer annotation data associated with media content. The viewer annotation data is received from viewers other than the first viewer. The computer implemented method includes identifying segments of the media content using the media content analyzer. The computer implemented method includes selecting at least one segment of the identified segments of the media content for inclusion in the media content summary. The computer implemented method includes sending the at least one selected segment of the media content to a device associated with the user.

In another particular embodiment, a tangible computer-readable storage medium includes operational instructions, that when executed by a processor, cause the processor to receive from a user a user request to create a media content summary including select segments of media content. The user request includes user specified criteria. The tangible computer-readable storage medium includes operational instructions, that when executed by the processor, cause the processor to identify segments of the media content using a media content analyzer. The media content analyzer is generated based on viewer annotation data received from viewers other than the user. The tangible computer-readable storage medium includes operational instructions, that when executed by the processor, cause the processor to select at least one segment of the identified segments of the media content for inclusion in the media content summary based on the user specified criteria. The tangible computer-readable storage medium includes operational instructions, that when executed by the processor, cause the processor to send the media content summary for presentation at a display device.

In another particular embodiment, a system includes an input interface to receive a request from a user to generate a media content analyzer to identify segments of media content and to generate a media content summary based on the identified segments of media content. The system includes a generator module to generate the media content analyzer based on viewer annotation data that is received from viewers different than the user. The system includes a selection module to select at least one segment of the identified segments for inclusion in the media content summary based on user specified criteria. The system includes an output interface to send the media content summary including the at least one selected segment to a display device.

In another particular embodiment, a computer implemented method includes receiving, at a media server, a request from a user to generate a media content analyzer. The computer implemented method includes analyzing a first set of viewer annotations associated with media content to determine at least one viewer response metric associated with the media content. The first set of viewer annotations are generated by viewers other than the user. The computer implemented method includes accessing media content analysis information associated with the media content. The computer implemented method includes generating the media content analyzer adapted to approximate the media content analysis information based on the at least one viewer response metric. The computer implemented method includes storing the media content analyzer in a memory.

Referring to FIG. 1, a block diagram of a first particular embodiment of a system to create a media content summary based on viewer annotations is depicted and generally designated 100. The system 100 includes a set-top box device 102 coupled to a media server 104 via a network 106. A display device 154 is coupled to the set-top box device 102.

The set-top box device 102 is operable to receive a media content summary 156 from the media server 104 via the network 106 and to display the media content summary 156 at the display device 154. In a particular embodiment, the media content summary 156 is a summary of the media content 112 that includes particular automatically selected segments of the media content 112. A user 140 may use the set-top box device 102 to interact with the media server 104. For example, the user 140 may use a remote control device 152 to send a user request 142 to a media content analyzer 110 of the media server 104 to identify segments 114, 115, 116, and 117 of the media content 112 for inclusion in the media content summary 156. The user 140 may control how the segments 114-

117 of the media content summary 156 are displayed at the display device 154 using the remote control device 152.

The media server 104 may include the media content analyzer 110, viewer annotation data 108, and the media content 112. Multiple viewers (not shown) other than the viewer 140 may view the media content 112 and input individual viewer annotations that are collected to form the viewer annotation data 108, as is described in more detail in the description of FIG. 3. For example, the viewer annotations may include facial expressions, hand gestures, text input, emoticon selections, avatar selections, other viewer annotation data, or any combination thereof. The viewer annotations may be received from an input device coupled to a computing device associated with each viewer. For example, the viewer annotations may be input via a camera (e.g. webcam), a keyboard, a mouse, other input device, or any combination thereof. In a particular embodiment, the viewer annotation data 108 is collected asynchronously, i.e. the viewer annotation data 108 is collected from viewers that view the media content during different time periods. In another particular embodiment, the viewer annotation data 108 is gathered synchronously, i.e. the viewer annotation data 108 is collected from viewers that view the media content concurrently.

The media content analyzer 110 may be generated based on the viewer annotation data 108 associated with the media content 112, as discussed in more detail below in the description of FIG. 3. The media content analyzer 110 is operable to identify the segments 114-117 of the media content 112, as is discussed in more detail below in the description of FIG. 2. The media content analyzer 110 is further operable to select one or more segments of the identified segments 114, 116, 118, and 120 and to send the selected segments via the network 106 to the set-top box device 102 associated with the user 140. For example, the media content analyzer 110 may select from among the segments 114-117 based on the user specified criteria 144 to create the media content summary 156.

In operation, the user 140 may send the user request 142 to the media server 104. The user request 142 may include user specified criteria 144. The user specified criteria 144 may include a time constraint 146 and a content type 148. The content type 148 may specify to the media content analyzer 110 to identify segments including the content type 148. For example, the content type 148 may indicate that the user 140 wishes to view segments of the media content 112 that includes players scoring during a sporting event, action scenes of an action program, or humorous scenes of a comedy program. To illustrate, the content type 148 may indicate that the user 140 wishes to view portions of the media 112 that other viewers annotated as including a humorous type of content. The time constraint 146 may specify a time within which the user 140 wishes to view the identified segments 114-117 of the media content 112. For example, the time constraint 146 may indicate that the portions of the media content 148 annotated as including humorous content have a viewing time of no more than fifteen minutes.

The media content analyzer 110 may receive the user request 142 and may automatically identify the segments 114-117 of the media content 112 for inclusion in the media content summary 156 based on the user specified criteria 144. In a particular embodiment, the media content analyzer 110 may sort the segments 114-117 of the media content 112 based on the user specified criteria 144 before selecting the selected segments of the media content for inclusion in the media content summary 156. For example, when the media analyzer 110 determines that a total viewing time of the segments 114-117 is greater than the time constraint 146, the media content analyzer 110 may sort the segments 114-117 based on the size of each segment or the number of user annotations for each segment 114-117 and select some but not all of the segments 114-117 for inclusion in the media content summary 156 based on the time constraint 146.

In a particular embodiment, when the user 140 is viewing a particular segment of the media content summary 156 and does not wish to view a remainder of the segment, the user 140 may view the next segment by sending a skip function 150 to the media server using the remote control device 152. The media server 104 may receive the skip function 150 after sending at least a portion of at least one selected segment of the media content 112 to the display device 154. The media server 104 may send a next selected segment to the display device 154 in response to receiving the skip function 150. For example, when the user 140 is viewing the first segment 114 and does not wish to view the remainder of the segment 114, the user 140 may send the skip function 150 to the media server 104 request the media server 104 to send the second segment 116 of the media content summary 156 to the set-top box device 102 for display at the display device 154.

By using the media content analyzer 110 to identify the segments 114-117 of the media content 112, the user 140 may view selected segments 114-117 of the media content summary 156, having a particular content type 148, within a time period indicated by the time constraint 146. The user 140 can view the media content summary 156 that includes those segments of the media content 112 that other viewers annotated as having the user specified content type 148 without having to view the entire media content 112, thereby saving time.

Figure 2:
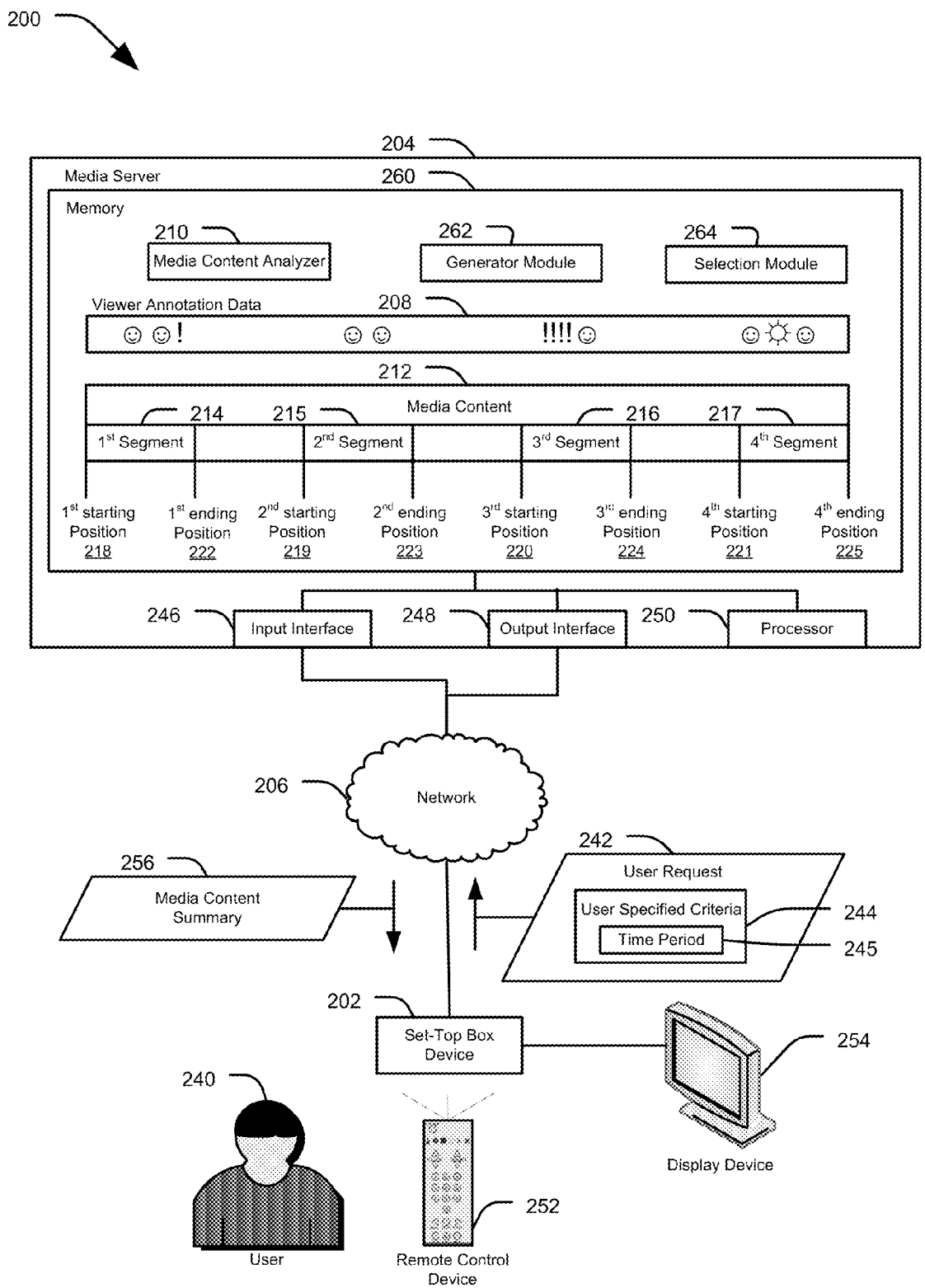
FIG. 2 is a block diagram of a second particular embodiment of a system create a media content summary based on viewer annotations.

Referring to FIG. 2, a block diagram of a second particular embodiment of a system to create a media content summary 256 based on viewer annotations is depicted and generally designated 200. The system 200 may include a set-top box device 202 coupled to a media server 204 via a network 206. A display device 254 may be coupled to the set-top box device 202.

The set-top box device 202 is operable to receive a media content summary 256 of media content 212 from the media server 204 via the network 206 and to display the media content summary at the display device 254. The set-top box device 202 may enable a user 240 to interact with the media server 204. For example, the user 240 may use a remote control device 252 to send a user request 242 from the set-top box device 202 requesting that a media content analyzer 210 identify segments 214, 215, 216, and 217 of media content 212 for inclusion in the media content summary 256. The user 240 may control how the segments 214-217 are displayed at the display device 154 with the remote control device 252.

The media server 204 may include a memory 260, an input interface 246, an output interface 248, and a processor 250. The memory 260 may include the media content analyzer 210, a generator module 262, a selection module 264, viewer annotation data 208, and the media content 212. The generator module 262 is operable to access the viewer annotation data 208 and to generate the media content analyzer 210 based on the viewer annotation data 208, as is described in more detail below in the description of FIG. 3. The media content analyzer 210 is operable to identify the segments 214-217 of the media content 212 for inclusion in the media content summary 256. The selection module 264 is operable to select one or more of the segments 214-217 for inclusion in the media content summary 256 based on user specified criteria 244. For example, the selection module 264 may select from among the segments 214-217 based on the user specified criteria 244 to create the media content summary 256 of the media content 212. The input interface 246 is operable to receive user requests, such as a user request 242, from the set-top box device 202 via the network 206. The output interface 248 is operable to send the media content summary 256 including at least one of the segments 214-217 of the media content 212 to the set-top box device 202 for display at the display device 254. The processor 250 is operable to execute operational instructions stored at the memory 260 for performing the various functions of the media server 204.

In operation, different viewers (not shown) other than the user 240 may view the media content 212 and generate the viewer annotation data 208, as is described below in the description of FIG. 3. In a particular embodiment, the viewer annotation data 208 is collected from viewers that view the media content 212 during different time periods. In another particular embodiment, the viewer annotation data 208 is collected from viewers that view the media content 212 concurrently.

In response to the user 240 sending the user request 242 to the media server 204, the generator module 262 may generate the media content analyzer 210 based on the viewer annotation data 208. The media server 204 may identify the segments 214-217 of the media content 212 based on the user specified criteria 244. The media server 204 may select at least one of the segments 214-217 for inclusion in the media content summary 256 based on the user specified criteria 244. The media server 204 may send the media content summary 256 that includes the selected segment(s) 214-217 to the set-top box device 202 for display at the display device 254.

In a particular embodiment, the media content analyzer 210 identifies the segments 214-217 by identifying a starting position and an ending position of each of the segments 214-217. For example, the media content analyzer 210 may identify a first segment 214 by identifying a first starting position 218 and a first ending position 222. The media content analyzer 210 may identify a second segment 215 by identifying a second starting position 219 and a second ending position 223. The media content analyzer 210 may identify a third segment 216 by identifying a third starting position 220 and a third ending position 224. The media content analyzer 210 may identify a fourth segment 217 by identifying the fourth starting position 221 and the fourth ending position 225. In a particular embodiment, the media content analyzer 210 identifies the starting positions 218-221 and the ending positions 222-225 based on a type of each viewer annotation of the viewer annotated data 208 and a number of viewer annotations associated with each of the segments 214-217. For example, when the user specified criteria 244 includes a humorous content type, the media content analyzer 210 may identify the segments 214-217 that have viewer annotations indicating humorous content. The media content analyzer 210 may sort the identified segments 214-217 based on the number of viewer annotations associated with each of the segments 214-217 and select from among the sorted segments 214-217 for inclusion in the media content summary 256 based on the number of viewer annotations. For example, the media content analyzer 210 may select the second segment 215 and the fourth segment 217 for inclusion in the media content summary 256 because the segments 215, 217 have the most number of viewer annotations indicating humorous content and can be viewed within the time period 245.

In a particular embodiment, the media content analyzer 210 identifies the starting positions 218-221 and the ending positions 222-225 by detecting scene transitions of the media content 212. For example, the media content analyzer 210 may identify scene transitions by detecting a change in video imagery or audio content. The media content analyzer 210 may identify portions of the viewer annotation data 208 associated with each segment 214-217 and select one or more of the segments 214-217 to send to the set-top box device 202 for presentation at the display device 254 based on the viewer annotation data 208. In a particular embodiment, the media content analyzer 210 identifies the starting positions 218-221 and the ending positions 222-225 to enable the identified segments 214-217 to be viewable within the time period 245.

By using the media content analyzer 210 to select from among the segments 214-217 of the media content 212 for inclusion in the media content summary 256, the user 240 can view the media content summary 256 within a specified time period 245. The segments 214-217 are identified and selected for inclusion in the media content summary 256 by the media content analyzer 210 based on the viewer annotation data 208 and the user specified criteria 244. In this way, the user 240 can view those segments of the media content 212 that other viewers annotated and that meet the user specified criteria 244.

Figure 3:
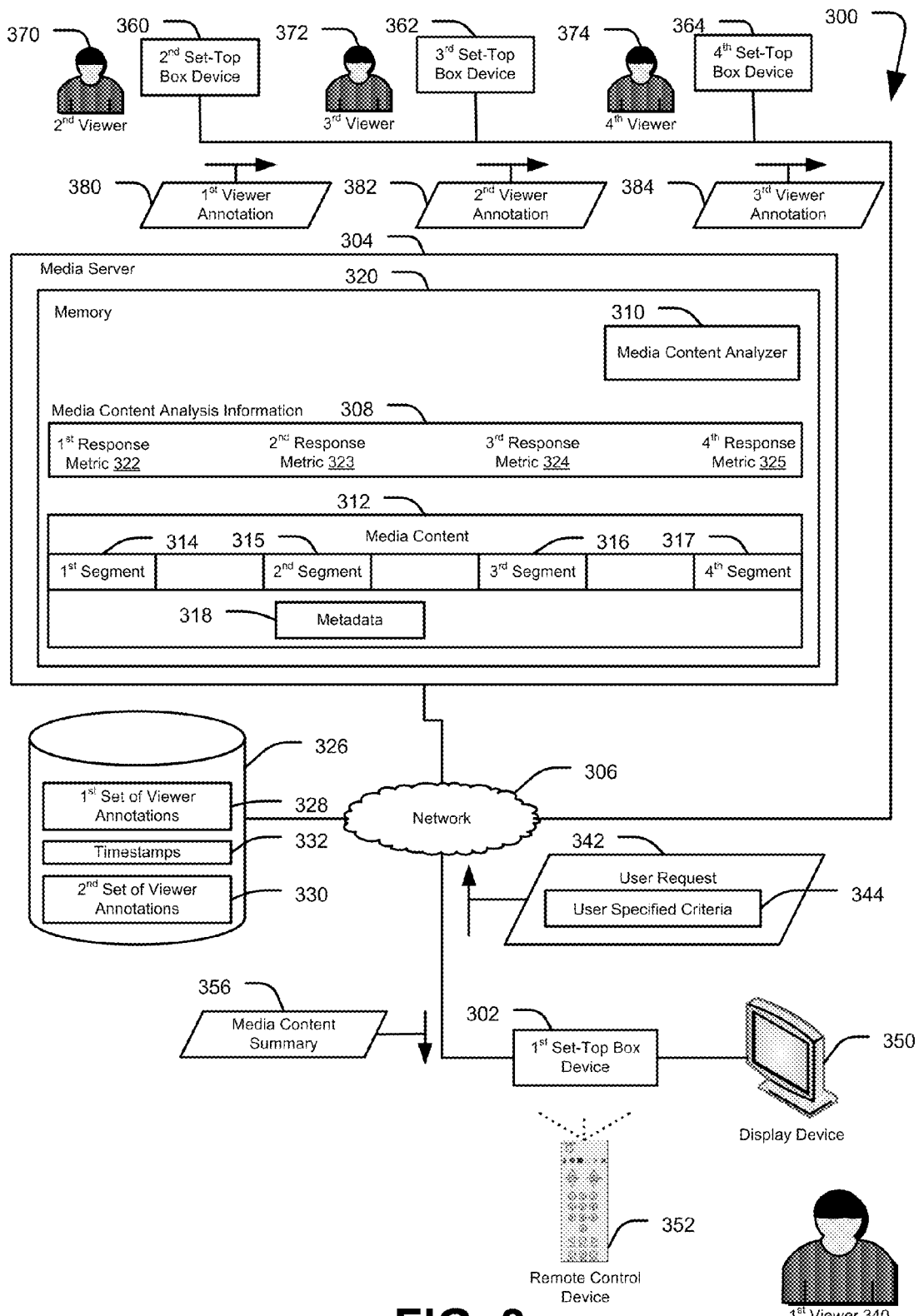
FIG. 3 is a block diagram of a third particular embodiment of a system to create a media content summary based on viewer annotations.

Referring to FIG. 3, a block diagram of a third particular embodiment of a system to create a media content summary based on viewer annotations is depicted and generally designated 300. The system 300 may include a first set-top box device 302 coupled to a media server 304 via a network 306. One or more additional set-top box devices, such as a second set-top box device 360, a third set-top box device 362, and a fourth set-top box device 364 may be coupled to the network 306. A database 326 may be coupled to a media server 304 via a network 306. A display device 350 may be coupled to the first set-top box device 302.

In a particular embodiment, the first set-top box device 302 is operable to receive a media content summary 356 from the media server 304 and to display the media content summary 356 at the display device 350. A remote control device 352 associated with the first set-top box device 302 may be operable to enable a first viewer 340 to send a user request 342 to the media server 302 to receive the summary of the media content 356 of the media content 312 for display at the display device 350.

In a particular embodiment, the database 326 is operable to store viewer annotation data, such as a first set of viewer annotations 328, a second set of viewer annotations 330, and timestamps 332 associated with the viewer annotations. In a particular embodiment, annotations 380, 382, and 384 are stored as the first set of viewer annotations 328 along with the timestamps 332. The timestamps 332 may be associated with and identify when the first set of viewer annotations 328 were created with reference to the media content 312. The first set of viewer annotations 328 may be generated by viewers having at least one characteristic common to the first viewer 340 that sends the user request 342. For example, the first viewer 340 may share an interest in a particular type of sport or enjoy similar media content genres with viewers that generated the viewer annotations 328. The second set of viewer annotations 330 may be received from viewers with a particular expertise associated with a genre of the media content 312. For example, the second set of viewer annotations 330 may include annotations from movie reviewers, movie critics, other experts, or any combination thereof.

The media server 304 may include a memory 320. The memory 320 may include media content analysis information 308, a media content analyzer 310, and media content 312. In a particular embodiment, the media server 304 is operable to generate the media content analyzer 310 in response to receiving the user request 342 to generate the media content analyzer 310. The first set of viewer annotations 328 and the second set of viewer annotations 330 may be associated with the media content 312. The media content analysis information 308 may include one or more metrics, such as a first response metric 322, a second response metric 323, a third response metric 324, and a fourth response metric 325. The response metrics 322-325 may be numerical representations of the first set of viewer annotations 328. For example, the response metrics 322-325 may identify that a portion of the media content 312 has twenty-two viewer annotations indicating a humorous type of content and twelve viewer annotations indicating an action type of content. At least one of the response metrics 322-325 may be determined based on analyzing the first set of viewer annotations 328. The media content analysis information 308 may be generated based on the second set of viewer annotations 330. The media content analyzer 310 may be adapted to approximate the media content analysis information 308 based on at least one of the response metrics 322-325. For example, the media content analyzer 310 may apply numerical weights to the response metrics 322-325 to approximate the media content analysis information 308.

A second viewer 370 may be associated with the second set-top box device 360, a third viewer 372 may be associated with the third set-top box device 362, and a fourth viewer 374 may be associated with the fourth set-top box device 364. The viewers 370, 372, and 374 may generate the annotations 380, 382, and 384 while viewing the media content 312 during different time periods or concurrently. The annotations 380, 382, and 384 may include a facial expression, a hand gesture, a text input, and an emoticon selection, avatar selection, other viewer annotation, or any combination thereof. In a particular embodiment, the annotations 380, 382, and 384 are stored as metadata 318 associated with the media content 312. In another particular embodiment, the annotations 380, 382, and 384 are stored as the first set of viewer annotations 328 at the database 326. The timestamps 332 may be stored at the database 326 with the first set of viewer annotations 328. Each timestamp of the timestamps 332 may identify when the associate viewer annotation was created with reference to the media content 312.

In operation, the first viewer 340 may send a user request 342 including user specified criteria 344 to the media server 304 via the network 306. For example, the first viewer 340 may use the remote control device 352 to instruct the first set-top box device 302 to send the user request 342 to the media server 304. In response to receiving the user request 342, the media content analyzer 310 may be generated by analyzing the first set of viewer annotations 328 associated with the media content 312 to determine at least one viewer response metric associated with the media content, such as the response metric 322-325. For example, the media content analyzer 310 may be generated by a generator module, such as the generator module 262 of FIG. 2. The media content analyzer 310 may be generated by accessing the media content analysis information 308. The media content analyzer 310 may approximate the media content analysis information 308 based on the response metrics 322-325. For example, the media content analyzer 310 may apply numerical weights to the response metrics 322-325 to approximate the media content analysis information 308, thereby approximating expert viewer annotations based on the annotations of other viewers.

The media content analyzer 310 may be stored at the memory 320 of the media server 304. The media analyzer 310 may identify segments 314, 315, 316, and 317 of the media content 312 and generate genre specific response values associated with each of the segments 314-317. The segments 314-317 may be portions of the media content 312 that have associated viewer annotations. The segments 314-317 may be identified by the media content analyzer 310 when creating a summary of the media content 312 for display at the display device. For example, the media content analyzer 310 may identify the segment 314 as having seven viewer annotations indicating a humorous genre and identify the segment 315 as having twelve viewer annotations indicating an action genre. The media content analyzer 310 may identify the segments 314-317 of the media content 312 by identifying portions of the media content 312 that have associated response metrics 322-325 and may change a size of the portions until the size satisfies the user specified criteria 344. For example, when the user specified criteria indicates that a summary viewable in fifteen minutes is to be generated, the media content analyzer 310 may identify the segments of the media content 312 that have the most number of viewer annotations corresponding to the user specified criteria 344, and adjust the starting and ending positions of each of the segments 314-317 until the total viewing time of the segments 314-317 is no more than fifteen minutes. The media content analyzer 310 may generate the response metrics 322-325 associated with each of the segments 314-317 based on the first set of viewer annotations 328 associated with each of the segments 314-317. The media content analyzer 310 may apply a numerical weight to each of the response metrics 322-325 to generate a second numerical value associated with the segments 314-317 and select the identified segments 314-317 based on the second numerical value.

The first viewer 340 may use the media content analyzer 310 to identify and view the media content summary 356 that includes selected portions of the media content 312. To illustrate, the first viewer 340 may use the media content analyzer 310 to identify and view the media content summary 256 that includes portions of the media content 312 that contain humorous segments of a humorous program or that contain action segments of an action program. The media content analyzer 310 may identify segments of the media content 312 based on the first set of viewer annotations 328 using the response metrics 322-325 to approximate the analysis of the second set of viewer annotations 330.

Figure 4:
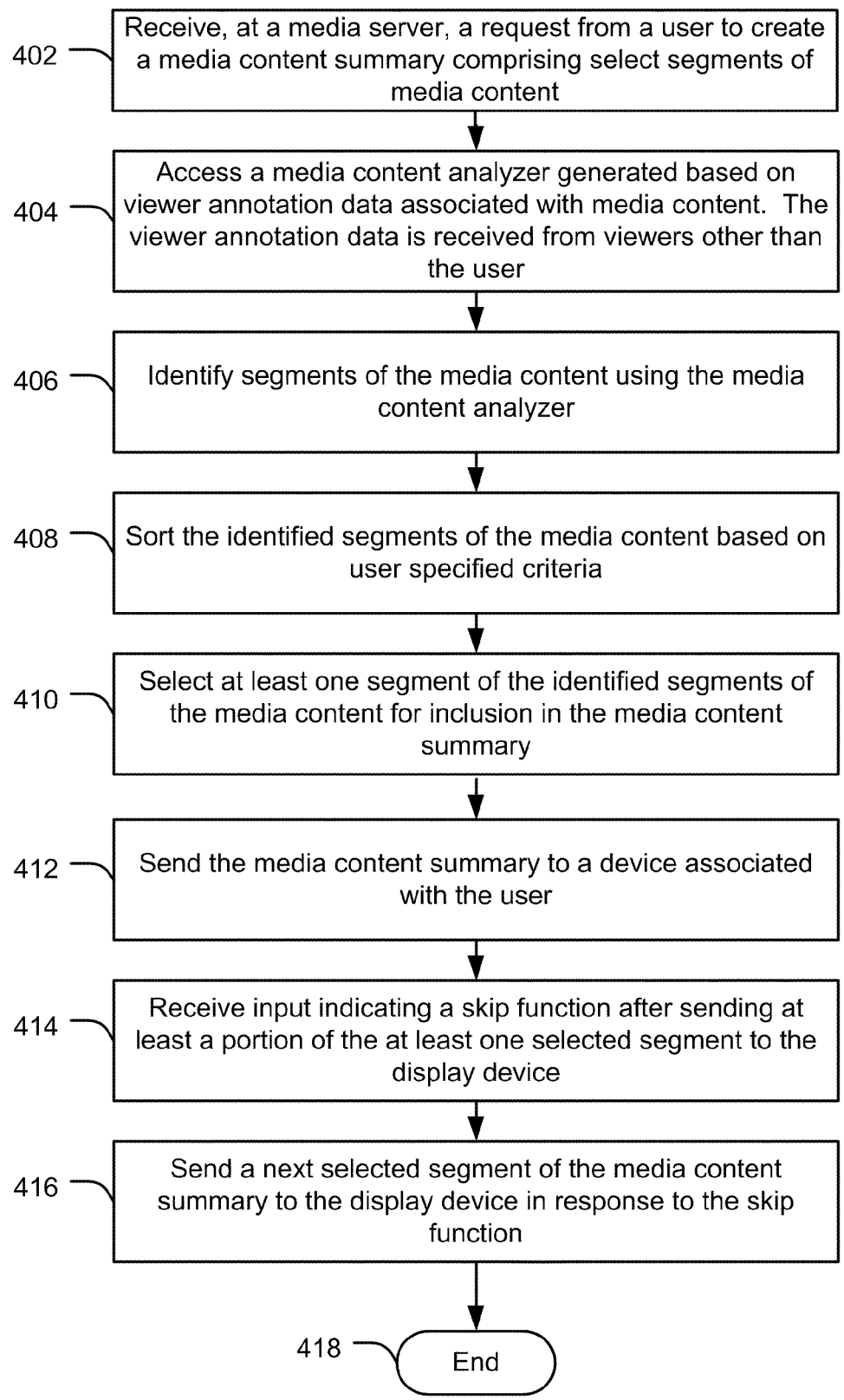
FIG. 4 is a flow diagram of a first particular embodiment of a method to create a media content summary based on viewer annotations.

Referring to FIG. 4, a flow diagram of a first particular embodiment of a method to create a media content summary based on viewer annotations is depicted. The method may be performed by a media content analyzer such as the media content analyzer 110 of FIG. 1, the media content analyzer 210 of FIG. 2, or the media content analyzer 310 of FIG. 3.

A request from a user to create a media content summary may be received, at 402. A media content analyzer may be accessed, at 404. The media content analyzer may be generated based on viewer annotation data associated with media content. The viewer annotation data may be received from viewers other than the user. Moving to 406, segments of the media content may be identified using the media content analyzer. Proceeding to 408, the identified segments of the media content may be sorted based on user specified criteria. Advancing to 410, at least one segment of the identified segments of the media content may be selected for inclusion in the media content summary. Continuing to 412, the media content summary may be sent to a display device. Proceeding to 414, input may be received indicating a skip function after sending at least a portion of the at least one selected segment to the display device. Continuing to 416, a next selected segment of the media content summary may be sent to the display device in response to the skip function. The method ends at 418.

By using a media content analyzer to identify and select segments of media content for inclusion in a media content summary, a viewer may view segments of the media content that other viewers annotated as matching a viewer specified criteria and may skip to a next segment of interest as desired. For example, a viewer who was unable to view one or more episodes of a particular television series may generate and view a summary of the missed episodes. The viewer can use the skip function to view only those segments of the media content summary that are of interest to the viewer. For example, when a viewer is interested in determining what happened to a particular character of a program, the viewer can skip segments that are not related to that particular character.

Figure 5:
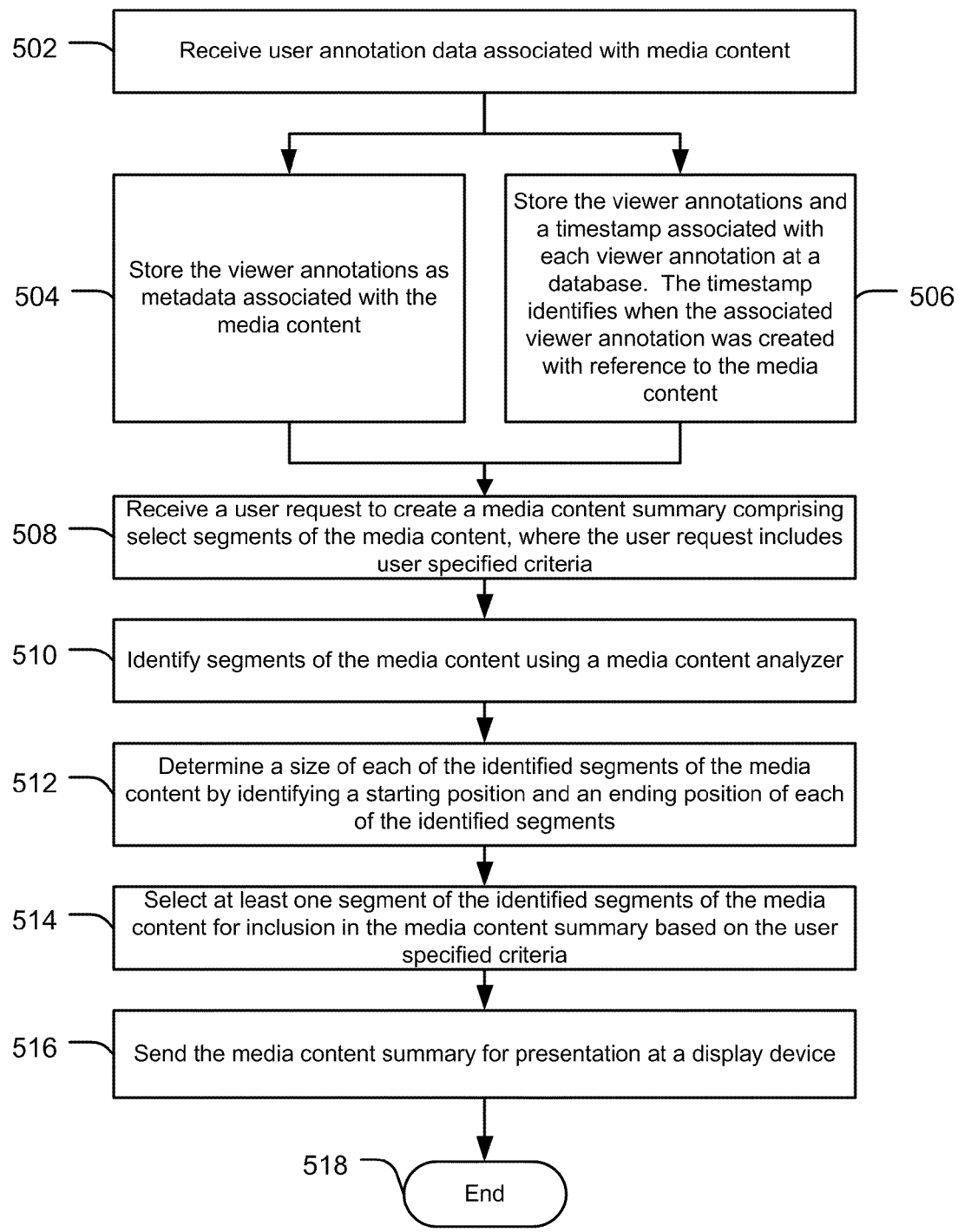
FIG. 5 is a flow diagram of a second particular embodiment of a method to create a media content summary based on viewer annotations.

Referring to FIG. 5, a flow diagram of a second particular embodiment of method to create a media content summary based on viewer annotations is depicted. The method may be performed by a media content analyzer, such as the media content analyzer 110 of FIG. 1, the media content analyzer 210 of FIG. 2, or the media content analyzer 310 of FIG. 3.

In a particular embodiment, user annotation data associated with media content is received, at 502. In a particular embodiment, the viewer annotations may be stored as metadata associated with the media content, at 504. In another particular embodiment, the viewer annotations and a timestamp associated with each viewer annotation may be stored at a database, at 506. The timestamp may identify when the associated viewer annotation was created with reference to the media content. Moving to 508, a user request to select segments of media content based on user specified criteria may be received. Proceeding to 510, segments of the media content may be identified using a media content analyzer. Advancing to 512, a size of each of the identified segments of the media content may be determined by identifying a starting position and an ending position of each of the identified segments. Continuing to 514, at least one segment of the identified segments of the media content may be selected for inclusion in a media content summary based on the user specified criteria. Proceeding to 516, the at least one selected segment of the media content may be sent for presentation at a display device. The method then ends at 518.

By using a media content analyzer to identify segments of media content, a viewer may view a media content summary that includes segments of the media content that other viewers annotated as matching a user specified criteria within a user specified time period. For example, a viewer who was unable to view a sporting event may generate and view a summary of the sporting event within a user specified time period.

Figure 6:
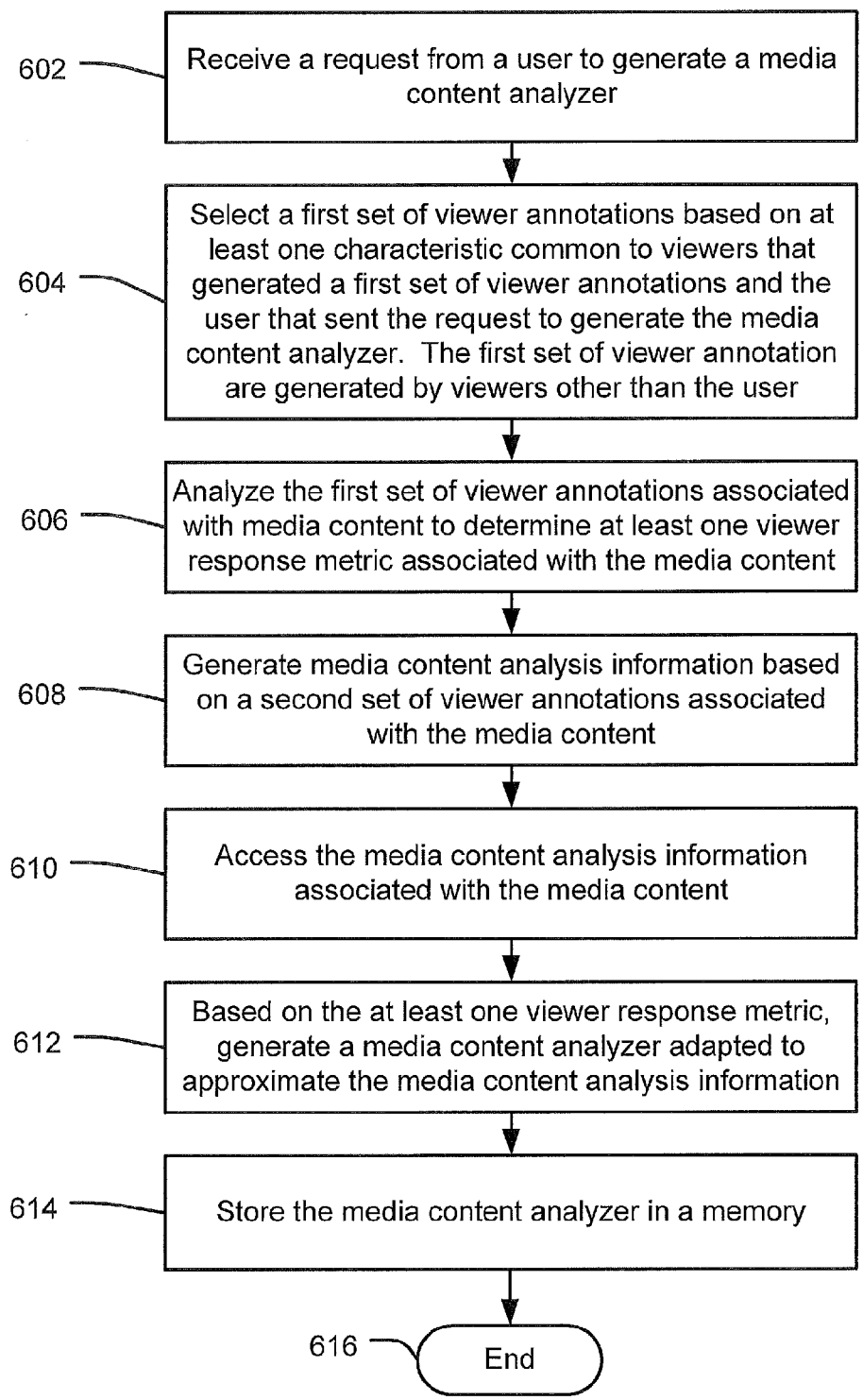
FIG. 6 is a flow diagram of a particular embodiment of a method to generate a media content analyzer.

Referring to FIG. 6, a flow diagram of a particular embodiment of a method to generate a media content analyzer is depicted. The method may be performed by the generator module 262 of FIG. 2.

A request to generate a media content analyzer may be received from a viewer, at 602. Advancing to 604, a first set of viewer annotations may be selected based on at least one characteristic common to viewers that generated the first set of viewer annotations and the viewer that sent the request. For example, the first set of viewer annotations may be selected because the viewers that generated the first set of viewer annotations and the viewer that sent the request are in a particular age bracket, live in a particular zip code, share a particular hobby, are members of a particular group, have other demographic similarities, or any combination thereof. The viewer annotations may include a facial expression, a hand gesture, a text input, an emoticon selection, other type of viewer annotation, or any combination thereof.

Moving to 606, the first set of viewer annotations associated with the media content may be analyzed to determine at least one viewer response metric associated with the media content. For example, the first set of viewer annotations may be analyzed to identify which portions of the media content have associated viewer annotations, a type of each viewer annotation (e.g. humor, scoring event, plot turning point, etc.), and a number of each viewer annotation type. To illustrate, the viewer annotations may be analyzed to determine that at five minutes and thirty-two seconds from the start of the media content, twenty out of twenty-five viewers annotated a scene of the media content as having a humorous content type. A viewer response metric may be generated to indicate that eighty percent of viewers annotated the portion of the media content at five minutes and thirty-two seconds as having a humorous content type.

Continuing to 608, media content analysis information may be generated based on a second set of viewer annotations associated with the media content. The second set of viewer annotations may be received from viewers with a particular expertise associated with a genre of the media content. For example, the second set of viewer annotations associated with a movie may be received from movie critics. Proceeding to 610, the media content analysis information may be accessed. Advancing to 612, a media content analyzer adapted to approximate the media content analysis information may be generated based on the at least one viewer response metric. For example, the media content analyzer may perform an analysis, to identify numerical weights that may be applied to the first set of viewer annotations to approximate the second set of viewer annotations. To illustrate, numerical weights may be generated for the first set of viewer annotations of each segment to approximate the annotations of the movie critics. Moving to 614, the media content analyzer may be stored in a memory. The method ends at 616.

By analyzing annotation data of experts, such as media critics/reviewers, a media content analyzer capable of approximating the annotation data of the experts may be based on viewer annotations. In this way, viewer annotations of media content may be used to identify segments of media content that experts may identify as being segments worthy of inclusion in a summary of the media content.

Figure 7:
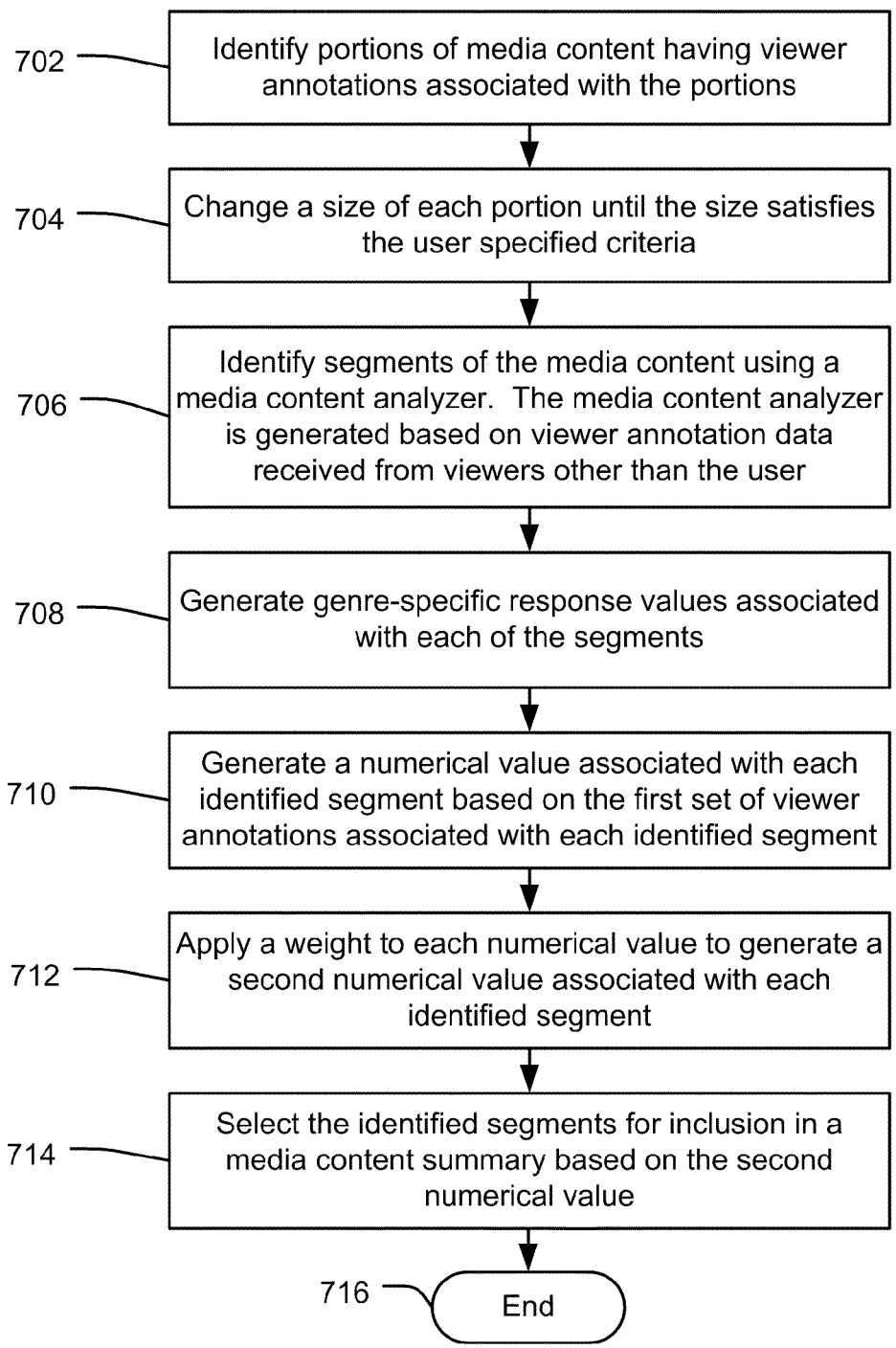
FIG. 7 is a flow diagram of a third particular embodiment of a method to create a media content summary based on viewer annotations.

Referring to FIG. 7, a flow diagram of a third particular embodiment of method to create a media content summary based on viewer annotations is depicted. The method may be performed by a media content analyzer, such as the media content analyzer 110 of FIG. 1, the media content analyzer 210 of FIG. 2, or the media content analyzer 310 of FIG. 3.

In a particular embodiment, portions of media content having viewer annotations associated with the portions are identified, at 702. Moving to 704, a size of each portion may be changed until the size satisfies the user specified criteria. For example, the size of each portion may be changed to enable the portions to be viewed within a user specified period of time. In another example, the size of each portion may be changed to optimize the portions to match annotations of viewers that are considered experts in the genre. Advancing to 706, segments of the media content may be identified using a media content analyzer. The media content analyzer may be generated based on viewer annotation data received from viewers other than the user. For example, the segments of the media content may be identified based on the portions of the media content. Proceeding to 708, genre-specific response values associated with each of the segments may be generated. For example, when a particular segment contains action content that some viewers find humorous, the particular segment may be identified as having eleven viewer annotations indicating a humorous content type and fourteen viewer annotations indicating an action content type. Advancing to 710, a numerical value associated with each identified segment may be generated based on the first set of viewer annotations. For example, the numerical value may be a total number of annotations, regardless of content type, for each segment. The numerical value may be a total number of annotations associated with a particular type of content for each segment. The numerical value may be expressed as percentage of viewers that annotated each segment. Moving to 712, a weight may be applied to each numerical value to generate a second numerical value associated with each identified segment. For example, a numerical weight may be applied to each numerical value to approximate annotations of viewers having an expertise in a genre associated with the media content. To illustrate, numerical values derived from viewer annotations may be weighted to approximate expert annotations. Proceeding to 714, the identified segments may be selected for inclusion in a media content summary based on the second numerical value. The method ends at 716.

By using a media content analyzer to identify segments of media content, a viewer may view a media content summary that includes segments of the media content that other viewers annotated as matching a viewer specified criteria, such as a time period or a genre. For example, when a viewer is unable to view a martial arts movie, the viewer may generate and view a summary of segments of the media content that are of interest to the viewer. To illustrate, the viewer may specify that the viewer only wishes to views segments of the media content that include leaping kicks but do not include throws.

Figure 8:
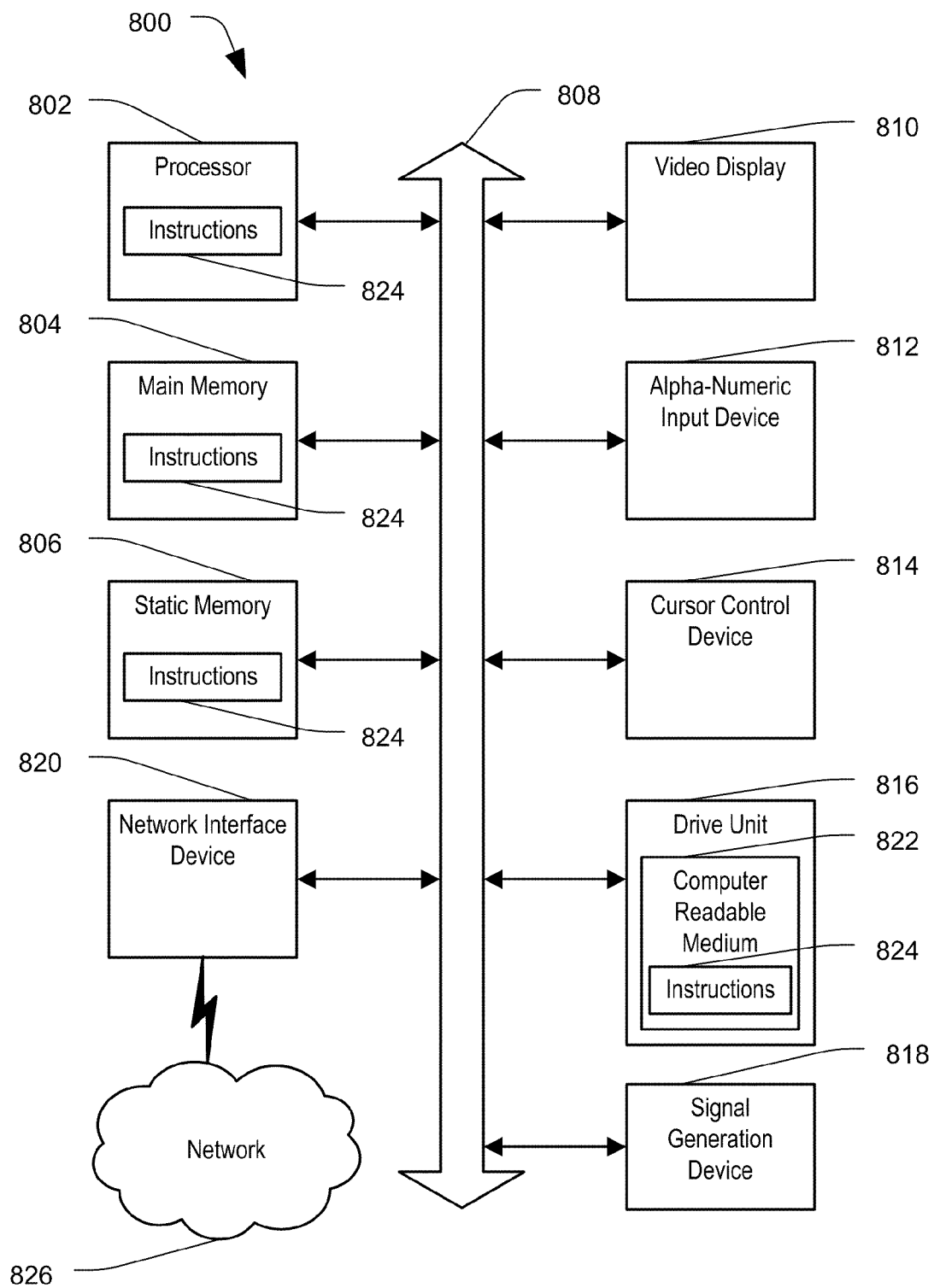
FIG. 8 is a block diagram of an illustrative embodiment of a general computer system.

Referring to FIG. 8, an illustrative embodiment of a general computer system is shown and is designated 800. The computer system 800 includes a set of instructions that can be executed to cause the computer system 800 to perform any one or more of the methods or computer based functions disclosed herein. The computer system 800, or any portion thereof, may operate as a standalone device or may be connected, e.g., using a network, to other computer systems or peripheral devices.

In a networked deployment, the computer system may operate in the capacity of a set-top box device or media server, such as the set-top box device 102 or the media server 104 of FIG. 1, the set-top box device 202 or the media server 204 of FIG. 2, and the set-top box device 302 or the media server 304 of FIG. 3. The computer system 800 can also be implemented as or incorporated into various devices, such as a personal computer (PC), a tablet PC, a personal digital assistant (PDA), a mobile device, a palmtop computer, a laptop computer, a desktop computer, a communications device, a web appliance, or any other machine capable of executing a set of instructions (sequential or otherwise) that specify actions to be taken by that machine. In a particular embodiment, the computer system 800 can be implemented using electronic devices that provide voice, video or data communication. Further, while a single computer system 800 is illustrated, the term "system" shall also be taken to include any collection of systems or sub-systems that individually or jointly execute a set, or multiple sets, of instructions to perform one or more computer functions.

As illustrated in FIG. 8, the computer system 800 may include a processor 802, e.g., a central processing unit (CPU), a graphics-processing unit (GPU), or both. Moreover, the computer system 800 can include a main memory 804 and a static memory 806 that can communicate with each other via a bus 808. As shown, the computer system 800 may further include or be coupled to a video display unit 810, such as a liquid crystal display (LCD), an organic light emitting diode (OLED), a flat panel display, a cathode ray tube (CRT) display, a solid-state display, or a projection display. Additionally, the computer system 800 may include an input device 812, such as a keyboard, a remote control device, and a cursor control device 814, such as a mouse. The computer system 800 can also include a disk drive unit 816, a signal generation device 818, such as a speaker or remote control device, and a network interface device 820. The network interface device 820 may be coupled to other devices (not shown) via a network 826.

In a particular embodiment, as depicted in FIG. 8, the disk drive unit 816 may include a computer-readable medium 822 in which one or more sets of instructions 824, e.g. software, can be embedded. Further, the instructions 824 may embody one or more of the methods or logic as described herein. In a particular embodiment, the instructions 824 may reside completely, or at least partially, within the main memory 804, the static memory 806, and/or within the processor 802 during execution by the computer system 800. The main memory 804 and the processor 802 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 824 or receives and executes instructions 824 responsive to a propagated signal, so that a device connected to a network 826 can communicate voice, video or data over the network 826. Further, the instructions 824 may be transmitted or received over the network 826 via the network interface device 820.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, or encoding a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an email or other self-contained information archive or set of archives may be considered equivalent to a tangible storage medium. Accordingly, the disclosure is considered to include any one or more of a computer-readable storage medium and other equivalents and successor media, in which data or instructions may be stored.

It should also be noted that software that implements the disclosed methods may optionally be stored on a tangible storage medium, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories.

Although the present specification describes components and functions that may be implemented in particular embodiments with reference to particular standards and protocols, the invention is not limited to such standards and protocols. For example, standards for Internet, other packet switched network transmission (e.g. TCP/IP, UDP/IP, HTML, and HTTP) and standards for viewing media content (e.g. MPEG, SMPTE, and H.264) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A computer implemented method, comprising:
   receiving, at a media server, a request from a user to create a media content summary comprising select segments of media content, wherein the request includes a user-specified criterion;
   accessing a media content analyzer generated based on viewer annotation data associated with media content, wherein the viewer annotation data is received from viewers;
   identifying segments of the media content using the media content analyzer, the identified segments having viewer annotation data associated with the identified segments;
   automatically changing a size of each of the identified segments until a total size of the resized segments satisfies the user-specified criterion;
   including the resized segments in the media content summary; and
   sending the media content summary to a device associated with the user.

2. The method of claim 1, wherein the media content analyzer:
   determines numerical weights to apply to the viewer annotation data; and
   applies the numerical weights to the viewer annotation data.

3. The method of claim 2, wherein the numerical weights are determined using a linear approximation.

4. The method of claim 1, further comprising:
   receiving input indicating a skip function after sending at least a portion of the media content summary to the device; and
   sending a next resized segment of the media content summary to the device in response to receiving the input indicating the skip function.

5. A non-transitory computer-readable storage medium comprising operational instructions, that when executed by a processor, cause the processor to:
   receive from a user request from a user to create a media content summary, wherein the user request includes user-specified criterion;
   select a first subset of viewer annotation data based on at least one characteristic common to viewers that generated the first subset of viewer annotation data and the user that sent the user request;
   identify segments of the media content using a media content analyzer, the media content analyzer generated based on the first subset of viewer annotation data, wherein the identified segments have the first subset of viewer annotation data associated therewith;
   automatically change a size of each of the identified segments until a total size of the resized segments satisfies the user-specified criterion;
   include the resized segments in the media content summary; and send the media content summary for presentation at a display device.

6. The non-transitory computer-readable storage medium of claim 5, further comprising operational instructions, that when executed by the processor, cause the processor to determine the size of each of the identified segments of the media content by identifying a starting position and an ending position of each of the identified segments.

7. The non-transitory computer-readable storage medium of claim 6, wherein identifying the starting position and the ending position of each of the identified segments comprises detecting scene transitions of the media content.

8. The non-transitory computer-readable storage medium of claim 6, wherein the starting position and the ending position of each of the identified segments are identified based on a type of each viewer annotation of the viewer annotation data and a number of the viewer annotations associated with each of the identified segments.

9. The non-transitory computer-readable storage medium of claim 6, wherein the user-specified criterion includes a time period and wherein automatically changing the size of each of the identified segments comprises identifying the starting position and the ending position of each of the identified segments such that the resized segments are viewable within the time period.

10. A system, comprising:
an input interface to receive a request from a user to generate a media content analyzer to identify segments of media content and to generate a media content summary based on the identified segments of media content;
a generator module to:
select a first subset of viewer annotation data based on at least one characteristic common to viewers that generated the first subset of viewer annotation data and the user associated with the request; and
generate the media content analyzer based on the first subset of viewer annotation data;
a selection module to select at least one segment of the identified segments for inclusion in the media content summary based on a user-specified criterion; and
an output interface to send the media content summary including the at least one selected segment to a display device.

11. The system of claim 10, wherein the user request includes the user-specified criterion.

12. The system of claim 10, wherein the viewer annotation data is collected from the viewers viewing the media content during different time periods.

13. The system of claim 10, wherein the viewer annotation data is collected from the viewers viewing the media content concurrently.

14. A computer implemented method, comprising:
receiving, at a media server, a request from a user to generate a media content analyzer;
analyzing a first set of viewer annotations associated with media content to determine at least one viewer response metric associated with the media content, the first set of viewer annotations generated by viewers;
accessing media content analysis information associated with the media content;
generating the media content analyzer adapted to approximate the media content analysis information based on the at least one viewer response metric;
storing the media content analyzer in a memory;
identifying segments of the media content using the media content analyzer, the identified segments having viewer annotations associated therewith; and
automatically changing a size of each identified segment until a total size of the resized segments satisfies a user-specified criterion.

15. The method of claim 14, wherein the first set of viewer annotations comprise at least one of a facial expression, a hand gesture, a text input, and an emoticon selection.

16. The method of claim 14, further comprising storing the viewer annotations as metadata associated with the media content.

17. The method of claim 14, further comprising storing, at a database, the viewer annotations and a timestamp associated with each viewer annotation, the timestamp identifying when the associated viewer annotation was created with reference to the media content.

18. The method of claim 14, further comprising generating genre-specific response values associated with each of the segments.

19. The method of claim 18, further comprising:
generating a numerical value associated with each identified segment based on the first set of viewer annotations associated with each identified segment;
applying a weight to each numerical value to generate a second numerical value associated with each identified segment; and
selecting at least one of the identified segments based on the second numerical value.

20. The method of claim 14, further comprising generating the media content analysis information based on a second set of viewer annotations associated with the media content.

21. The method of claim 20, wherein the second set of viewer annotations comprises viewer annotations received from viewers with a particular expertise associated with a genre of the media content.

* * * * *